United States Patent [19]
Kelly

[11] Patent Number: 5,135,288
[45] Date of Patent: Aug. 4, 1992

[54] METHOD AND DEVICE FOR REINFORCING A SOLID TIRE

[76] Inventor: David Kelly, 3050 Orleans Road, Unit #13, Mississauga, Ontario, Canada, L5L 5P7

[21] Appl. No.: 681,781

[22] Filed: Apr. 8, 1991

[51] Int. Cl.$^5$ ............................................. B60B 21/00
[52] U.S. Cl. ..................................... 301/8; 301/10 R; 301/95
[58] Field of Search ...................... 301/5, 6 R, 8, 9 R, 301/10 R, 14, 95-99, 63 R; 152/323; 29/894

[56] References Cited

U.S. PATENT DOCUMENTS

| | | | |
|---|---|---|---|
| 1,688,146 | 10/1972 | Klaus . | |
| 2,014,811 | 9/1935 | Mayer | 152/323 X |
| 2,734,778 | 2/1956 | Cook | 301/8 |
| 2,770,278 | 11/1956 | Dillon | 152/41 |
| 3,758,161 | 9/1973 | Bradley et al. | 301/63 R |

Primary Examiner—Russell D. Stormer
Attorney, Agent, or Firm—Leydig, Voit & Mayer

[57] ABSTRACT

The invention provides a method of reinforcing a solid tire mounted upon a cylindrical hub such as, for example, a solid rubber fork lift truck tire. Tires have a solid flexible outer layer bonded to an inner cylindrical metal band. The hub is press fit within the band. In order to increase lateral stability or traction, operators often install tires of width greater than the size for which the hub is designed. The unsupported periphery of the band is subjected to impact loads and premature tire failure occurs. The invention provides a removable reinforcing ring which is press fit within the inner cylindrical surface of the metal band adjacent the hub. The outer cylindrical surface of the ring is of diameter to securely engage the band in operation but may be removed and reinstalled during normal maintenance by the same press which separates the tire and hub.

7 Claims, 2 Drawing Sheets

METHOD AND DEVICE FOR REINFORCING A SOLID TIRE

FIELD OF THE INVENTION

The invention relates to a method of and removable reinforcing ring for reinforcing a solid tire mounted upon a cylindrical hub of width less than the tire width.

BACKGROUND OF THE INVENTION

Various types of load bearing industrial machinery include solid tires, the most common of which are forklift trucks. Unlike inflated tires, solid tires have an outer peripheral solid flexible layer, such as solid rubber, bonded to an inner cylindrical metal band. The tire is mounted upon a cylindrical hub wherein the outer cylindrical surface of the hub is press fit within the inner cylindrical surface of the metal band. The band is slightly stretched during press fitting and therefore the hub and tire are securely connected without the need for mechanical connectors or welding. Hydraulic presses are used to separate and connect the tires and hubs during regular maintenance and tire replacement.

In order to increase lateral stability of a fork lift for example, or increase the tire bearing surface for load distribution or traction increasing purposes, machine operators often install solid tires of width greater than the width for which the machine was designed and greater than the width of the hub. It is, of course, possible to replace an existing hub with one of greater width to accommodate the wider tires. However, hubs are relatively expensive and other associated machine parts such as brake drums, axles, etc. may be required to complete such a conversion. The least expensive and most common approach to install overwidth tires on a standard hub and replace prematurely worn or damaged tires as required. The need to replace worn tires as an operating expense is usually not questioned by supervisors, whereas the need to replace substantial machine parts such as hubs involves a capital expenditure which must be justified.

Such overwidth tires may have a 1 or 2 inch outer portion of their width which is unsupported and extends beyond the hub. The unsupported outer portion is exposed to impact loads as the vehicle tire collides with obstacles or is driven over uneven surfaces. The outer portion of the tire band may be bent or dented and the bond between the band and flexible solid rubber surface broken resulting in premature tire failure.

To reinforce the unsupported outer portion of the tire band, it is known to install a reinforcing ring adjacent the hub to support the internal diameter of the band. To secure such conventional reinforcing rings in place, the ring is welded to the tire band. The heat from welding may cause the bond between the solid rubber tire surface and tire band to break leading to premature tire failure. Welding the ring effectively forces one to either dispose of the ring with the worn tire or to gouge and re-weld the ring during replacement. Bolting the ring to the hub involves drilling of the hub thereby weakening the hub, and may be impractical due to interference of connecting bolts with adjacent machine parts. Both welding and bolting of the ring therefore involve separate additional operations during tire replacement. Welding in particular requires additional equipment which may not be readily available to service personnel and involves a skill that may not be common to the trade.

DISCLOSURE OF THE INVENTION

To address the disadvantages of the conventional methods and devices described above, the present invention proposes a novel method of reinforcing a solid tire and a novel reinforcing ring.

According to the invention is provided a method of reinforcing a solid tire mounted upon cylindrical hub, the hub being of width less than the width of the tire, the tire including an outer peripheral solid flexible layer bonded to an inner cylindrical metal band, the outer cylindrical surface of the hub being press fitted within the inner cylindrical surface of the metal band, said method comprising press fitting a removable reinforcing ring within the inner cylindrical surface of the metal band adjacent the hub, the ring having an outer cylindrical surface of diameter to securely engage the band in operation and of width substantially equal to the difference between the width of the band and the width of the hub.

Further according to the invention is provided a removable reinforcing ring for tires, the tires being press fit mounted upon a cylindrical hub of width less than the width of the tire, the tire including an outer peripheral solid flexible layer bounded to an inner cylindrical metal band, the outer cylindrical surface of the hub being press fitted within the inner cylindrical surface of the metal band, said ring having an outer cylindrical surface diameter to securely engage the band in operation and of width substantially equal to the difference between the width of the band and the width of the hub, the ring being press fit within the inner cylindrical surface of the metal band adjacent the hub.

The reinforcing ring according to the invention is removable and re-usable. The installation and removal of the ring utilizes the same equipment and skills as the installation and removal of the tire from the hub.

BRIEF DESCRIPTION OF THE DRAWINGS

In order that the invention may be readily understood, an embodiment of the invention will now be described by way of example with reference to the accompanying drawings.

DETAILED DESCRIPTION OF THE INVENTION

Figure 1:
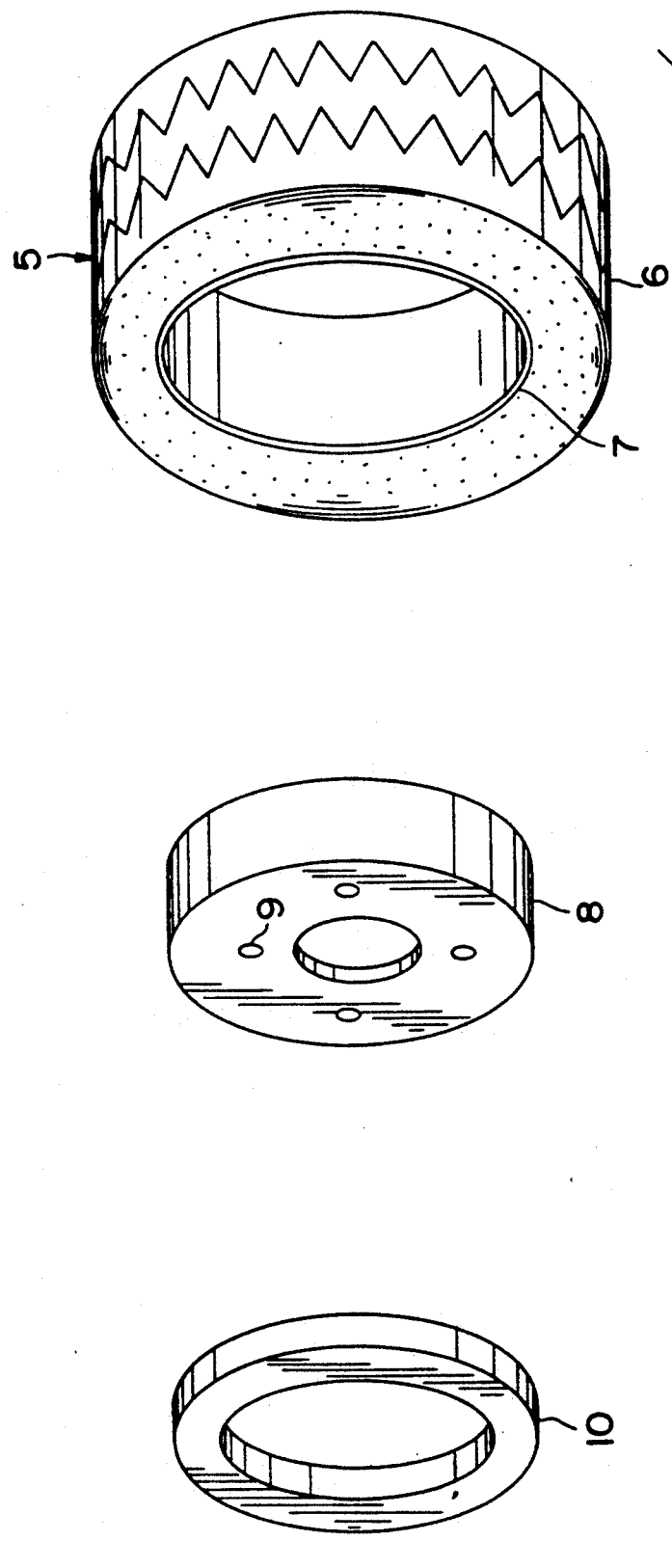
FIG. 1 is an exploded perspective view of (from left to right) a press fit reinforcing ring according to the invention, press fit hub and tire.

The general construction of a reinforced solid tire mounted upon a hub is shown in FIG. 1. The tire 5 has an outer peripheral solid flexible layer 6 (such as solid rubber) bonded to an inner cylindrical metal band 7. The solid tire 5 is mounted upon a cylindrical hub 8. The hub 8 is mounted to a vehicle or machine axle generally with bolts extending through holes 9 in the hub 8 in a conventional manner.

The outer cylindrical surface of the hub 8 is conventionally press fit within the inner cylindrical surface of the metal band 7. Press fitting during installation and tire removal is accomplished through use of large hydraulic presses. The metal band 7 is slightly stretched as the hub 8 is pressed into the interior surface of the band 7. As a result the hub 8 and tire 5 are securely connected and easily separated for tire replacement without the requirement of mechanical connectors.

As described above in respect of conventional hub and tire assemblies, the original assembly design calls for a matching of hub 8 and tire band 7 width such that the metal band 7 is fully supported across its complete width by the adjacent hub 8. However, in order to gain the benefits of wider tires 5 without incurring the expense of purchasing wider hubs 8, it is common for tires 5 of width greater than the width of the hub 8 to be installed on such hubs 8 as illustrated clearly in FIG. 3.

Figure 3:
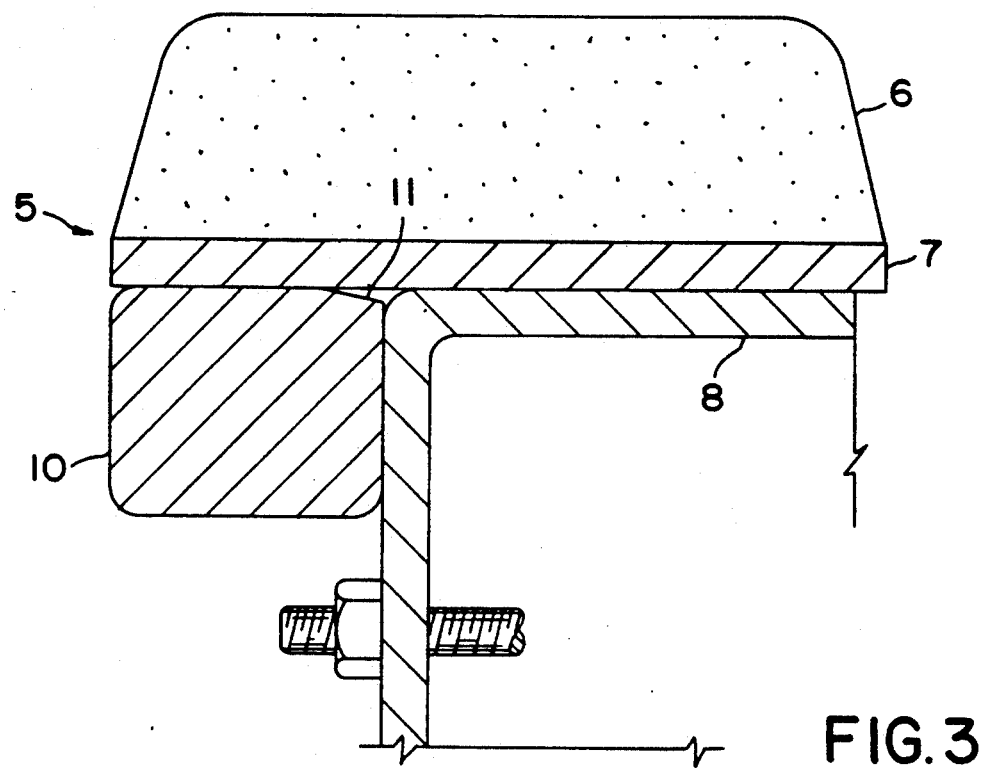
FIG. 3 is a sectional view along line 3—3 of FIG. 2.
Figure 2:
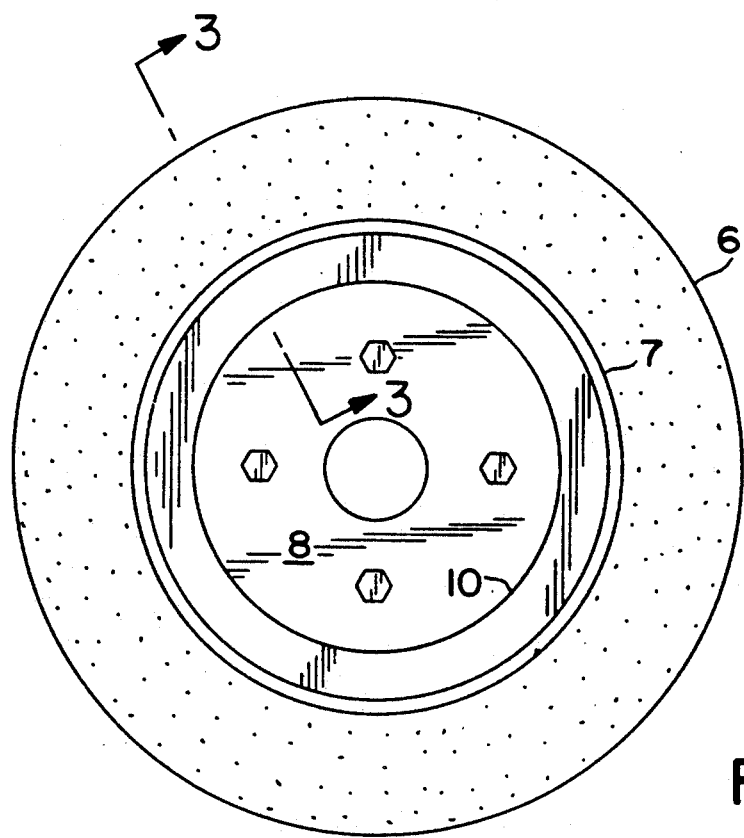
FIG. 2 is an elevation view of an assembled ring hub and tire.

To prevent premature tire 5 failure, bending or denting of the metal band 7, the present invention provides a removable reinforcing ring 10 and a method of reinforcing the tire 5 using such a ring 10. As shown in FIGS. 1 and 3, the removable reinforcing ring 10 has an outer cylindrical surface of diameter to securely engage the metal band 7 of the tire 5 in operation. The ring 10 is press fitted within the cylindrical surface of the metal band 7 adjacent the hub 8. The longitudinal axes of the hub 8, band 7 and ring 10 are substantially coaxial. The outer diameters "d" of the ring 10 and hub 8 are approximately equal to mate with the inner diameter of the band 7 in the assembled condition illustrated in FIGS. 2 and 3. The ring 10 is preferably constructed of metal but may also be constructed of polymerized materials such as high impact plastics, rubber, fiberglass and composite materials. The outer cylindrical surface of a metal ring 10 may be machined as indicated in FIG. 3 to ensure a matching diameter with the hub 8, however, other well known metal fabrication methods may also be used which achieve a like result such as roll forming expansion, casting, grinding or burnishing.

The width "w" of the removable reinforcing ring 10 is substantially equal to the difference between the width of the band 7 and the width of the hub 8. The metal band 7 is therefore supported substantially across its full width. For ease of manufacturing and to minimize stock requirements, a range of fixed widths "w" of reinforcing rings 10 may be manufactured to accommodate a range of standard tire widths. The reinforcing ring 10 and hub 8 are installed within the tire 5 by press fitting with a hydraulic press such that the outer side surfaces of the tire 5 and ring 10 are flush. As drawn in FIG. 3, the outer side surfaces are shown on the left and the inner side surfaces on the right. A standard size ring 10 of width "w" may be used with a hub 8 having a combined width less than the width of the tire such that an overhang of width "x" results adjacent to the inner side surface of the tire 5. This minimal overhang "x" is tolerable since the inner side surface of the tire 5 generally does not suffer as much damage as the outer side surface. The advantage of allowing a slight overhang "x" is that rings 10 of standard width "w" may be used for a range of widths of tire 5. For example: If a hub 8 of width 4 inches is used with tires of width $4\frac{3}{4}$ to $5\frac{1}{4}$ inches, a ring of width 1 inch may be flush mounted on the outer side of the tire 5. The unsupported overhang "x" will range from $-\frac{1}{4}$ (hub 8 extending beyond the tires 5) to $\frac{1}{4}$ inch (tire 5 extending beyond the hub 8). It will be apparent that the adjacent surfaces of the ring 10 and the hub 8 may need not abut or be connected together in any way. The stretching of the metal band 7 during the press fitting operation ensures that the assembly of the tire 5, hub 8, and reinforcing ring 10 remains integrally connected during operation.

To facilitate installation of the ring 10 within the metal tire band 7, the inward portion 11 of the cylindrical surface of the ring 10 adjacent the hub 8 is tapered radially. During press fitting of the ring 10 within the metal band 7, the tapered inward portion 11 guides the ring 10 into position. The ring 10 is preferably of solid substantially rectangular cross-section for ease of manufacture and strength, however, it will be apparent that other cross-section designs will equally function to reinforce the band 7. The cross-section design will vary depending on the manufacturing methods chose in general.

As described above, the invention provides a method of reinforcing solid tires 5 which utilizes the same equipment and skills as conventional hub 8 and tire 5 assembly operations. The reinforcing ring 10 is removable and replaceable unlike the mechanically connected or welded rings of the prior art. The ring 10 provides flexibility of choice in tire width and enables simple retro-fitting to existing equipment without damaging the tire 5 or hub 8.

I claim:

1. A method of reinforcing a solid tire mounted upon a cylindrical hub, the hub being of a width less than the width of the tire, the tire including an outer peripheral solid flexible layer bonded to an inner cylindrical metal band of a width substantially equal to the width of the tire, the outer cylindrical surface of the hub being press fitted within the inner cylindrical surface of the metal band, said method comprising press fitting a removable reinforcing ring within the inner cylindrical surface of the metal band adjacent the hub, the ring having an outer cylindrical surface of a diameter to securely engage the band in operation and a width substantially equal to the difference between the width of the band and the width of the hub.

2. A removable reinforcing ring for tires, the tires being press fit mounted upon a cylindrical hub of a width less than the width of the tire, the tire including an outer peripheral solid flexible layer bonded to an inner cylindrical metal band of a width substantially equal to the width of the tire, the outer cylindrical surface of the hub being press fitted within the inner cylindrical surface of the metal band, said ring having an outer cylindrical surface of a diameter to securely engage the band in operation and a width substantially equal to the difference between the width of the band and the width of the hub, the ring being press fit within the inner cylindrical surface of the metal band adjacent the hub.

3. A ring according to the claim 2, wherein the inward portion of the outer cylindrical surface of the ring adjacent the hub is tapered radially.

4. A ring according to claim 2, wherein the ring, when installed within the band, abuts the hub.

5. A ring according to claim 2, wherein the ring is of solid cross-section.

6. A ring according to claim 5, wherein the ring is substantially rectangular in cross-section.

7. A ring according to claim 2 wherein the ring is metal.

* * * * *